May 12, 1959
J. K. PARK ET AL
2,886,470
TREATMENT OF FIBROUS GLASS WITH AQUEOUS
EMULSIONS OF METALS AND ALLOYS
Filed Dec. 28, 1953
FIG-1-
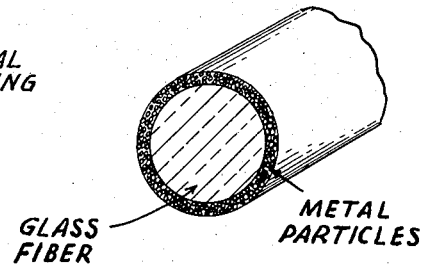
FIG-2-
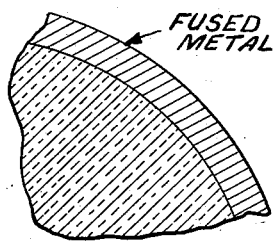
FIG-3-
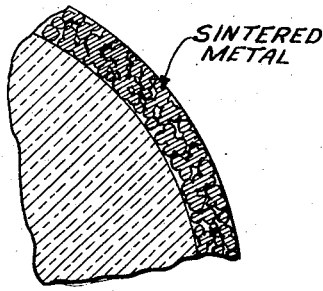
FIG-4-
INVENTORS:
JOHN K. PARK
ALFRED MARZOCCHI.
BY
ATTYS.

United States Patent Office

2,886,470
Patented May 12, 1959

2,886,470

TREATMENT OF FIBROUS GLASS WITH AQUEOUS EMULSIONS OF METALS AND ALLOYS

John K. Park and Alfred Marzocchi, Pawtucket, R.I., assignors to Owens-Corning Fiberglas Corporation, a corporation of Delaware Application December 28, 1953, Serial No. 400,788

4 Claims. (Cl. 117—126)

This invention relates to treatments for fibrous material and particularly to methods of applying metals and alloys of metals to fibrous glass to enhance its properties.

In the past many sizes and finishes have been applied to fibrous glass in order to provide desirable physical properties including high tensile strength, resistance to abrasion, good appearance, handleability and the like. Sizes including those comprising starch and gelatine and others comprising a film former, a lubricant and a coupling agent have been applied to fibrous glass materials in order to give them handleability in subsequent operations and finishes have been applied to provide adhesion to resinous materials. A constant search is in progress for treatments which will provide improved abrasion resistance, appearance, tensile strength and flex life.

It is an object of this invention to provide metal coatings upon fibrous materials to protect their surfaces and enhance their physical properties.

It is also an object to provide methods of applying uniform coatings of metal to glass surfaces.

It is a further object to provide such methods which make it possible to apply metals and alloys upon a strand of glass fibers without disrupting the integrity of the strand.

Further objects will be apparent from the description which follows.

It has been discovered that finely divided metals in the form of an emulsion or dispersion can be applied to a surface of glass in order to provide a substantially continuous metal coating upon the glass surface after removal of the liquid with which the metal is emulsified or in which it is dispersed.

Finely divided metals may be applied at elevated temperatures or at room temperature as will be apparent from the examples which follow. These examples are intended to illustrate and not limit the invention.

In the drawings Figure 1 illustrates a metal coated fiber; Figure 2 is a greatly enlarged view of a glass fiber coated with metal particles.

Figure 3 is a sectional view of a fiber coated with fused metal; and

Figure 4 is a partial, enlarged, sectional view of a sintered metal coating.

Example I

Any metal or alloy of metal which is liquid at temperatures below the boiling point of water may be emulsified with water and applied to the glass surface and then dried to form a coating of metal. Wood's alloy comprising 50 percent bismuth, 25 percent lead, 12.5 percent tin and 12.5 percent cadmium which melts at about 71° C. is introduced into water which is then heated to a temperature above the melting point of the metal. The mixture is violently stirred in homogenizing equipment to provide a finely divided emulsion of molten metal and water. Fibrous glass is then introduced into the emulsion to substantially coat the surface of the glass, see Figure 2. The water is removed by drying to provide a coating of the 50:25:12.5:12.5 bismuth-lead-tin-cadmium alloy on the glass surface.

Other metals and alloys of metals may be emulsified with water and applied as in Example I. Some of these alloys and their melting temperatures are as follows.

| Alloy: | Melting point, ° C. |
|---|---|
| Rose's metal: 40:20:20 bismuth-tin-lead | 94 |
| Lipowitz' alloy: 50:27:13:10 bismuth-lead-cadmium | 71.7 |
| D'Arcet metal: 50:25:25 bismuth-lead-tin | 94 |

| | Solidification temperature, ° C. |
|---|---|
| Alloy A: 52.5:32:15.5 bismuth-lead-tin | 96 |
| Alloy B: 50.1:24.9:14.2:10.8 bismuth-lead-tin-cadmium | 65.6 |
| Alloy C: 50.4:25.1:1:14.3:10.2 bismuth-lead-tin cadmium | 67.5 |
| Alloy D: 52.2:26.0:14.8:7.0 bismuth-lead-cadmium-tin | 68.5 |
| Alloy E: 48.8:24.3:13.8:13.1 bismuth-lead-tin-cadmium | 68.5 |
| Alloy F: 50.0:34.4:9.4:6.2 bismuth-lead-tin-cadmium | 76.5 |
| Alloy G: 53.2:39.7:7.1 bismuth-lead-cadmium | 90 |
| Alloy H: 49.9:43.4:6.7 bismuth-lead-cadmium | 95 |

Various other low melting temperature alloys may be used, i.e., other Lipowitz' alloys may be used.

Glass coated with metal by treating with an emulsion of molten metal may be subjected to heat treatment for fusing the metal (see Figure 3), to air drying, and to other treatments to change the physical properties of the metal coating.

The metal particles may be sintered instead of fused by elevating the temperature controllably to a point less than the fusion temperature in order to achieve surface cohesion between metal particles (see Figure 4).

The emulsions may be applied to the glass surfaces by dipping, spraying, wiping, flooding or suction methods. Dependent upon the proportion of metal in the emulsions, one or more applications of the treating liquid may be desirable to achieve the total metal deposition which is desired.

Room temperature as used herein denotes temperatures of from about 17° C. to about 35° C.

The metals applied as water emulsions may preferably be in the powdered form to facilitate melting and emulsification.

Variations and modifications may be made within the spirit and scope of the following claims.

We claim:

1. In a method of treating fibrous glass, the steps of applying an emulsion of a melted metal and water to the fibrous glass and drying to form a solidified metal coating on the glass surfaces.

2. A method of metal coating fibrous glass comprising forming an emulsion of a metal and water, said metal having a melting point less than 100° C., and higher than room temperature, applying said emulsion to said fibrous glass, and removing the water to form a solid metal coating on said fibrous glass.

3. In a method of treating fibrous glass, the steps of applying an emulsion of a melted metal alloy and water to the fibrous glass and drying to form a solidified metallic coating on the glass surfaces.

4. A method of metal coating fibrous glass comprising forming an emulsion of a metal alloy and water, said metal alloy having a melting point less than 100° C.

and higher than room temperature, applying said emulsion to said fibrous glass, and removing the water to form a solid metallic coating on said fibrous glass.

References Cited in the file of this patent

UNITED STATES PATENTS

| | | | |
|---|---|---|---|
| 998,341 | Illingsworth | July 18, | 1911 |
| 1,765,676 | Jones | June 24, | 1930 |
| 2,132,886 | Voelker | Oct. 11, | 1938 |
| 2,280,135 | Ward | Apr. 21, | 1942 |
| 2,551,712 | Soby | May 8, | 1951 |
| 2,583,855 | Kenis | Jan. 29, | 1952 |
| 2,584,763 | Waggoner | Feb. 5, | 1952 |
| 2,616,165 | Brennan | Nov. 4, | 1952 |
| 2,699,415 | Nachtman | Jan. 11, | 1955 |

FOREIGN PATENTS

| | | |
|---|---|---|
| 566,718 | Great Britain | 1945 |

OTHER REFERENCES

Science News Letter, Oct. 12, 1952, Oct. 18, 1952, cols. 2 and 3 p. 246.

Mellor's Comprehensive Treatise on Inorganic Chemistry, vol. 4 (only pp. 707–708 relied upon).